(12) United States Patent
Dyrbusch et al.

(10) Patent No.: US 9,617,885 B2
(45) Date of Patent: Apr. 11, 2017

(54) METHOD FOR MONITORING A PRESSURE SENSOR IN A DELIVERY AND METERING SYSTEM FOR A REACTANT OF A CATALYTIC CONVERTER

(71) Applicant: Robert Bosch GmbH, Stuttgart (DE)

(72) Inventors: Damian Dyrbusch, Ludwigsburg (DE); Andreas Feldges, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 548 days.

(21) Appl. No.: 13/972,216

(22) Filed: Aug. 21, 2013

(65) Prior Publication Data

US 2014/0053535 A1    Feb. 27, 2014

(30) Foreign Application Priority Data

Aug. 23, 2012 (DE) .................. 10 2012 215 024

(51) Int. Cl.
| | |
|---|---|
| *F01N 3/10* | (2006.01) |
| *F01N 3/20* | (2006.01) |
| *F01N 11/00* | (2006.01) |
| *F02D 41/22* | (2006.01) |

(52) U.S. Cl.
CPC ............. *F01N 3/10* (2013.01); *F01N 3/2066* (2013.01); *F01N 11/00* (2013.01); *F02D 41/222* (2013.01); *F01N 2550/05* (2013.01); *F01N 2900/1808* (2013.01); *F01N 2900/1812* (2013.01); *Y02T 10/24* (2013.01); *Y02T 10/40* (2013.01); *Y02T 10/47* (2013.01)

(58) Field of Classification Search
CPC ......... Y02T 10/47; Y02T 10/24; Y02T 10/40; Y02T 10/44; F01N 11/00; F01N 2550/05; F01N 2900/1808; F01N 2900/1812; F01N 3/206; F01N 3/2066; F01N 2550/10; F01N 2610/14; F02D 2200/0406; F02D 41/0055; F02D 41/1441; F02D 41/22; F02D 41/222; F02D 41/3836; F02M 25/0702; F02M 25/0777

See application file for complete search history.

(56) References Cited

U.S. PATENT DOCUMENTS

| | | | | |
|---|---|---|---|---|
| 5,488,938 | A * | 2/1996 | Ohuchi ............... | F02D 41/0055 123/568.16 |
| 2003/0188528 | A1* | 10/2003 | Tost ...................... | B01D 53/90 60/286 |
| 2010/0083770 | A1* | 4/2010 | Kock ...................... | G01F 1/34 73/861.357 |

(Continued)

*Primary Examiner* — Daniel S Larkin
*Assistant Examiner* — Jamar Ray
(74) *Attorney, Agent, or Firm* — Michael Best & Friedrich LLP

(57) ABSTRACT

A method is made available for monitoring a pressure sensor (18) in a pressure-controlled delivery and metering system for a liquid reactant of a catalytic converter, in particular of an SCR catalytic converter. The delivery and metering system is provided for delivering the reactant from a tank (10) and for metering the reactant via a pressure line (16) and a metering module (19). In order to monitor the pressure sensor (18) which is located in the pressure line (16), a flow rate measurement is carried out in the pressure line (16) and/or in a return path (17) taking into account the relationship between the pressure p and the corresponding flow rate v.

7 Claims, 2 Drawing Sheets

(56) References Cited

U.S. PATENT DOCUMENTS

2010/0114455 A1* 5/2010 Karlsson ............... F01N 3/2066
  701/102
2012/0031073 A1* 2/2012 Grater .................... F01N 3/208
  60/274

* cited by examiner

METHOD FOR MONITORING A PRESSURE SENSOR IN A DELIVERY AND METERING SYSTEM FOR A REACTANT OF A CATALYTIC CONVERTER

BACKGROUND OF THE INVENTION

The present invention relates to a method for monitoring a pressure sensor in a pressure-controlled delivery and metering system for a liquid reactant of a catalytic converter, in particular of an SCR catalytic converter, and to a corresponding delivery and metering system.

Methods and devices are known for operating an internal combustion engine, in particular in motor vehicles, in the exhaust gas region of which an SCR (Selective Catalytic Reduction) catalytic converter is arranged, which catalytic converter reduces the nitrogen oxides ($NO_x$) contained in the exhaust gas of the internal combustion engine to nitrogen in the presence of a reducing agent. As a result, the proportion of nitrogen oxides in the exhaust gas can be considerably reduced. For the reaction to proceed, ammonia ($NH_3$) is required as a reducing agent. This reducing agent or reactant is mixed into the exhaust gas. In order to make available ammonia, an aqueous urea solution is usually used, said solution being injected into the exhaust gas section downstream of the SCR catalytic converter using a metering device. The injection of the urea solution into the exhaust section is carried out as a function of demand and should take place very precisely.

The urea solution is usually stored in the motor vehicle in a urea solution tank. In general, a delivery and metering system is provided for delivering the urea solution from the tank. This system comprises a delivery unit with a delivery pump and a pressure line which opens into a metering unit via which the reactant is injected under pressure into the exhaust section. The system is a pressure-control unit which is controlled and monitored substantially on the basis of the signals of a pressure sensor which is assigned to the pressure line. The spraying in of the reactant by means of the metering unit is carried out at a predefineable system pressure.

Since the delivery and metering system is a component of the motor vehicle which is relevant for exhaust gas, it is necessary to monitor the functioning of this system. In current systems, the pressure sensor is monitored only statically or for minimum and maximum limits. As a rule, an offset is checked when a system start occurs. During the increase of pressure in the system and during the metering mode it is as a rule checked only whether the pressure is in the expected range. If an overpressure fault occurs, it is therefore not possible to determine precisely whether, for example, a line is blocked or whether a defective pressure sensor is present. Since as a rule there is no second pressure sensor in the system, dynamic plausibility checking of the pressure sensor is not possible.

SUMMARY OF THE INVENTION

In contrast with the above, the invention is based on the object of making available a method for monitoring and checking the plausibility of the pressure sensor in a delivery and metering system for the reactant of a catalytic converter, in order to increase the reliability of this system which is relevant for exhaust gas and therefore to ensure optimum post-treatment of the exhaust gas via the SCR catalysis.

The method according to the invention is based on a pressure-controlled delivery and metering system which is provided for applying a reactant to a catalytic converter, in particular to an SCR catalytic converter. In this context, the delivery and metering system delivers the liquid reactant from a tank by means of a delivery pump. The reactant is metered into the exhaust section at a predefineable system pressure via a pressure line and a metering module. The pressure control of the system is based on the signals of a pressure sensor which detects the pressure in the pressure line. The signals of the pressure sensor are passed on to a control unit and processed, with the result that the control can be performed by corresponding actuation of the actuators in the system.

In order to monitor the pressure sensor there is provision according to the invention that at least one flow rate measurement is carried out in the pressure line and/or in a return path of the system which is, if appropriate, provided. By taking into account the relationship between the pressure p and the detectable flow rate v, it is possible, in particular through comparison with reference values, to determine the functional capability of the pressure sensor and/or the plausibility of the signals which can be detected at the pressure sensor. In order to measure the flow rate, it is possible to install one or more customary flow sensors in the system, in particular in the pressure line, for example upstream or downstream of the pressure sensor in the delivery direction, or in a return line, for example upstream or downstream of a branch of a reactor which is, if appropriate, present, viewed in the return direction. The core of the invention is that as a result of the relationship, present in every operating phase, between the flow rate in the line system and the pressure in the pressure line it is very advantageously possible to monitor the pressure sensor. All that is necessary is for the flow rate to be sensed at at least one point in the system, in particular by means of a corresponding flow sensor, and for the values relating to the flow rate and the signals of the pressure sensor to be evaluated. If the expected relationship between the measured pressure at the pressure sensor and the detected flow rate is not present, it is to be assumed that there is a fault at the pressure sensor. The expected values (setpoint curves) can be recorded, for example, in a calibration phase or already at the factory and stored in a control device. The monitoring can be carried out by reconciliation with the currently detected values, which are recorded, for example, in a specific operating phase.

The measurement of the flow rate can either be performed in the pressure line, for example upstream or downstream of the pressure sensor viewed in the delivery direction, or the measurement of the flow rate takes place in a return path of the system, for example immediately or shortly after the branching of the return path viewed in the return direction, or in a section of the return path upstream of a return pump viewed in the return direction. Depending on the position of the flow sensor which is used and depending on the operating phase in which the flow rate measurement is carried out, there are various relationships between the pressure and the flow rate. If the flow rate is detected in the region of the pressure line, in the operating phases specified in Table 1 it is possible to use the following relationships for the evaluation of the measureable flow rate v and of the pressure p detected at the pressure sensor.

TABLE 1

| Operating phase | Relationship between p and v |
|---|---|
| Filling of the line system | $p = dv/dt + c$ |
| Pressure build-up in the line system | $p = (1 - c_1 * v) * c_2$ |

TABLE 1-continued

| Operating phase | Relationship between p and v |
| --- | --- |
| Venting of the line system | $p = (1 - c_1 * v) * c_2$ |
| Metering mode | $p = (1 - c_1 * v) * c_2$ |
| Decreasing of pressure in the line system | $p = c * v$ |
| Venting of the line system | $p = dv/dt + c$ |

Here, p describes the pressure which can be detected at the pressure sensor; v describes the flow rate which can be measured in the pressure line, and c, $c_1$ and $c_2$ describe various constants which can be empirically determined, for example in a test phase of the system.

In another refinement of the method according to the invention, the flow rate in the return line is detected. It is also possible here to measure the flow rate in various operating phases and to infer the functional capability of the pressure sensor by means of a corresponding relationship with the pressure which can be detected at the pressure sensor. In the case of the detection of the flow rate in the return line, the relationships of the pressure p and of the flow rate v which are described above are inverted. The relationships which can be used according to the invention, between the pressure p and the flow rate v which can be detected in the return line, are compiled for the various operating phases in the following Table 2.

TABLE 2

| Operating phase | Relationship between p and v |
| --- | --- |
| Filling of the line system | $v = dp/dt + c$ |
| Pressure build-up in the line system | $v = (1 - c_1 * p) * c_2$ |
| Venting of the line system | $v = (1 - c_1 * p) * c_2$ |
| Metering mode | $v = (1 - c_1 * p) * c_2$ |
| Decreasing of pressure in the line system | $v = c * p$ |
| Venting of the line system | $v = dp/dt + c$ |

The invention also comprises a pressure-controlled delivery and metering system for a reactant of a catalytic converter, in particular of an SCR catalytic converter, wherein the delivery and metering system comprises a delivery path with a delivery pump and, if appropriate, a return path with a return pump and, if appropriate, a restrictor, as well as a pressure line, a pressure sensor and a metering module. Furthermore, this pressure-controlled delivery and metering system has at least one flow sensor which is arranged in the pressure line and/or in the return path. The pressure sensor or sensors is/are provided, in particular, for monitoring the pressure sensor, wherein depending on where the pressure sensor is arranged at least one flow rate measurement is carried out in the pressure line and/or in the return path, and the function of the pressure sensor is detected by means of the relationship which is present between the measureable flow rate v and the pressure p which is detected at the pressure sensor. In this way it is possible to monitor or perform plausibility checking of the pressure sensor. For further details on the method for monitoring the pressure sensor, reference is made to the description above.

Finally the invention comprises a computer program which executes all the steps of the described monitoring method, when it is carried out on a computing device or a control device, and to a computer program product with program code which is stored on a machine-readable carrier, for carrying out the method according to the invention, when the program is executed on a computing device or a control device. The implementation of the method according to the invention as a computer program or as a computer program product has the advantage that this program can also be readily used in existing motor vehicles by loading the computer program into, for example, the control device of the motor vehicle, provided that at least one corresponding flow sensor is present, in order thereby to be able to use the method according to the invention for monitoring or checking the plausibility of the pressure sensor in the system.

BRIEF DESCRIPTION OF THE DRAWINGS

Further features and advantages of the invention can be found in the following description of exemplary embodiments in conjunction with the drawings. In this context, the individual features can each be implemented individually or in combination with one another.

In the drawings.

DETAILED DESCRIPTION

Figure 1:
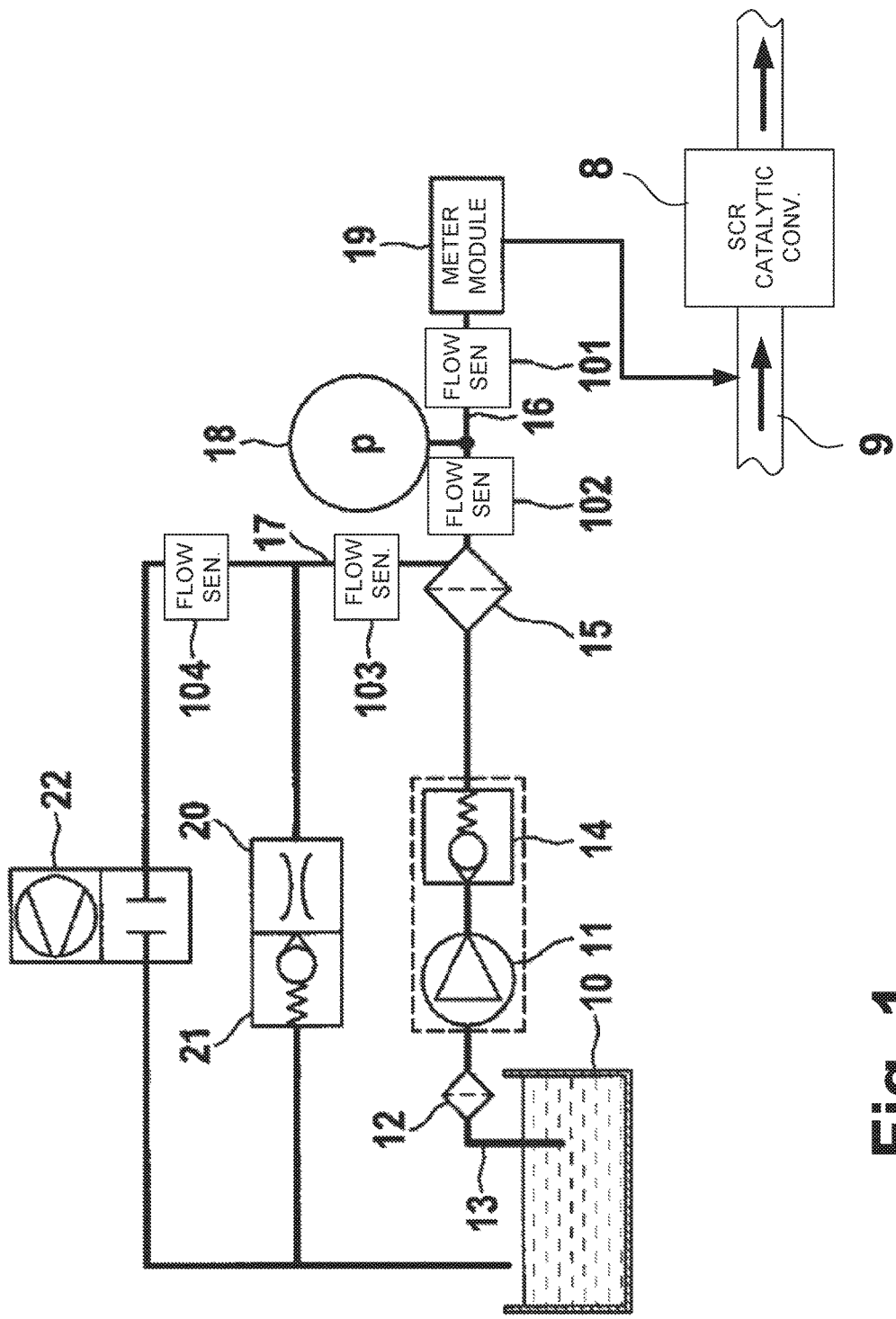
FIG. 1 shows a schematic illustration of the components of a current system for the pressure-controlled delivery and metering of a liquid reactant into the exhaust section of an internal combustion engine with possible positions of the flow sensor or sensors provided and used according to the invention.

The block diagram of a pressure-controlled delivery and metering system shown in FIG. 1 is provided, in particular, as a delivery and metering system for the reactant of an SCR catalytic converter 8 in which a liquid urea solution is injected into an exhaust section 9 upstream of the catalytic converter 8, in order to permit a reaction of nitrogen oxides in the catalytic converter 8.

The liquid medium, that is to say the urea solution, is stored in a tank 10. The solution is sucked through a suction line 13 by the delivery pump 11 via a preliminary filter 12. The delivery pump 11 is assigned a pressure valve 14, with the result that the urea solution can be compressed and transported to the main filter 15. Connections for the pressure line 16 and a return line 17 are provided on the clean side of the filter 15. A pressure sensor 18, which is monitored according to the invention, is assigned to the pressure line 16. During normal operation, the delivery and metering system is adjusted to a predefineable system pressure. In this context, the signals which can be detected by the pressure sensor 18 are evaluated in a control device (not shown) and the various actuators in the system are correspondingly actuated. The liquid medium is sprayed here under pressure into the exhaust section (not shown) via the metering module 19. The system shown here is equipped with a return path 17. The feeding back of medium, in particular from the metering module 19 and, if appropriate, from the pressure line 16 is provided in order to be able to remove the medium, in particular, from the frost-sensitive metering module after the motor vehicle is parked, with the result that in the event of freezing of the urea solution, which occurs at approximately −11° C., frost damage cannot occur to the sensitive components as a result of the pressure of ice caused by the frozen medium. The return path 17 shown here comprises a restrictor 20 with nonreturn valve 21 and, parallel thereto, a recirculation pump (return pump) 22 which can be embodied, for example, as a lifting magnet diaphragm pump, like the actual delivery pump 11. The method according to the invention for monitoring the pressure sensor 18 by means of one or more flow rate measurements can be used in such a system with a return path. However, it is also possible to use the monitoring method according to the invention in a system without a return path, in particular without a return pump, that is to say in a system which has, for example, just one restrictor in the return line.

Figure 2:
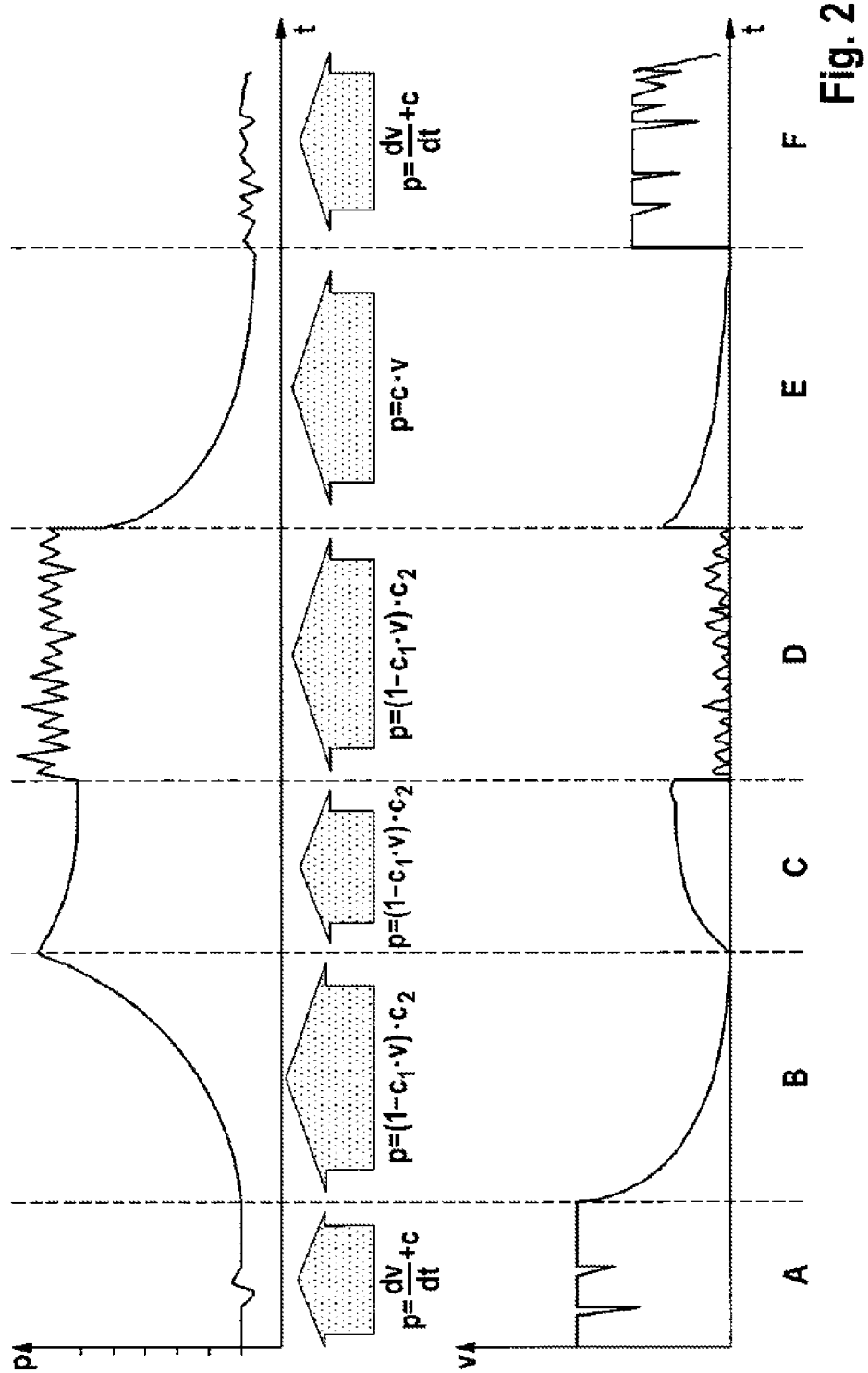
FIG. 2 shows a graphic illustration of the relationship present between the flow rate v and the pressure p in the various operating phases of a pressure-controlled delivery and metering system.

A precondition for the execution of the monitoring method according to the invention is that a flow sensor is arranged at at least one location in the system. The flow sensor or sensors can be provided, for example, in the pressure line 16, illustrated here as items 101 and 102. Furthermore, one or more flow sensors can be provided in the return path 17, if one is present, said sensors being represented here by the positions 103 and 104. Depending on the position of the flow sensor used and depending on the operating phase in which the delivery and metering system is being operated, different computational relationships are present between the measureable flow rate v and the signal detected at the pressure sensor 18, for the pressure p. These various computational relationships are illustrated in FIG. 2 for various operating phases of the delivery and metering system. The relationships shown in FIG. 2 apply to a situation in which the flow rate in the pressure line 16 is measured, for example by means of a flow rate sensor at the item 101 and/or 102. If a flow sensor is inserted in the return line 17, for example in the item 103 and/or 104, comparable relationships for the various operating phases apply, but the pressure p and the flow rate v are respectively inverted.

The relationship shown in FIG. 2 between the detected pressure p and the measureable flow rate v in the phase A relates to the operating phase in which the line system of the delivery and metering system is filled. In this context, the delivery pump 11 is set to pumping mode, and the return pump 22 is not operating and the metering valve or the metering module 19 is open. In this case, the relationship $p = dv/dt + c$ applies.

The section B in FIG. 2 shows the operating phase of the pressure build-up in the line system. In this context, the delivery pump 11 is set to delivery mode. The return pump 22 is off and the metering valve 19 is closed. In this phase, the relationship $p = (1 - c_1 * v) * c_2$ applies.

In the section C in FIG. 2, the operating phase of the venting of the system is illustrated, wherein air in the line system is discharged to the outside via the metering valve 19. In this context, the delivery pump 11 is set to delivery mode, the return pump 22 is closed and the metering valve 19 is opened. The relationship $p = (1 - c_1 * v) * c_2$ applies.

In the section D in FIG. 2, the operating phase of the metering mode is shown. Here, the delivery pump 11 is actuated in the pump mode. The return pump 22 is closed and the metering valve 19 is open or closed depending on the metering requirement. In this operating phase, the relationship $p = (1 - c_1 * v) * c_2$ applies.

In the section E in FIG. 2, the operating phase of the decreasing of pressure in the line system is illustrated. Here, the delivery pump 11 is off, the return pump 22 is in the delivery mode (return delivery) and the metering valve 19 is closed. In this operating phase the relationship $p = c * v$ applies.

In the section F in FIG. 2, the operating phase of emptying of the line system is shown. Here, the delivery pump 11 is off, the return pump 22 is in the delivery mode (return delivery). The metering valve 19 is open. In this operating phase, the relationship $p = dv/dt + c$ applies, that is to say in a way corresponding to that during the filling of the system.

Depending on the operating phase (A-F) of the delivery and metering system in which the flow rate measurement takes place, the corresponding computational relationship for the evaluation of the signals of the flow rate sensor and of the pressure sensor to be monitored is used. The evaluation can take place, for example, in a control device. In particular through comparison with reference values it is possible to detect, from the currently detectable sensor signals, whether the pressure sensor 18 is functioning correctly or incorrectly. It is therefore possible for the method according to the invention easily to perform monitoring and/or plausibility checking of the measured pressure signal, with the result that in the case of a detectable fault in the pressure sensor it is possible to immediately initiate corresponding steps, for example exchanging of the pressure sensor, in order to be able to restore as quickly as possible the correct function of the pressure-controlled system which is based on this sensor.

The invention claimed is:

1. A pressure-controlled delivery and metering system for a reactant of a catalytic converter, the system comprising:
    a catalytic converter reactant delivery path;
    a catalytic converter reactant delivery pump (11) positioned in the catalytic converter reactant delivery path;
    a pressure sensor (18) configured to monitor a pressure of the catalytic converter reactant in the reactant delivery path; and
    at least one flow sensor (101, 102, 103, 104) configured to monitor the pressure sensor (18) using at least one flow rate measurement of the catalytic converter reactant.

2. The pressure-controlled delivery and metering system according to claim 1, wherein the at least one flow sensor (101, 102, 103, 104) is in a pressure line (16).

3. The pressure-controlled delivery and metering system according to claim 1, wherein the at least one flow sensor (101, 102, 103, 104) is in a return path (17).

4. The pressure-controlled delivery and metering system according to claim 1, wherein the at least one flow sensor (101, 102, 103, 104) is in a pressure line (16) and in a return path (17).

5. The pressure-controlled delivery and metering system according to claim 1, wherein the catalytic converter is an SCR catalytic converter.

6. The pressure-controlled delivery and metering system according to claim 1, further comprising a return path (17) with a return pump (22).

7. The pressure-controlled delivery and metering system according to claim 1, further comprising a restrictor (20), a pressure line (16), a pressure sensor (18) and a metering module (19).

* * * * *